US012458183B1

(12) United States Patent
Lee

(10) Patent No.: US 12,458,183 B1
(45) Date of Patent: Nov. 4, 2025

(54) CADDY SYSTEM AND METHOD OF ATTACHMENT TO A SUPPORT

(71) Applicant: Selah Inventions, LLC, Chino, CA (US)

(72) Inventor: Praise Lee, Chino, CA (US)

(73) Assignee: City of Hope, Duarte, CA (US)

( * ) Notice: Subject to any disclaimer, the term of this patent is extended or adjusted under 35 U.S.C. 154(b) by 43 days.

(21) Appl. No.: 18/423,621

(22) Filed: Jan. 26, 2024

Related U.S. Application Data

(60) Provisional application No. 63/442,048, filed on Jan. 30, 2023.

(51) Int. Cl.

| | |
|---|---|
| ***A47K 10/38*** | (2006.01) |
| ***A47K 1/09*** | (2006.01) |
| ***A47K 10/16*** | (2006.01) |
| ***F16B 2/06*** | (2006.01) |
| *A47C 7/62* | (2006.01) |
| *A47K 10/18* | (2006.01) |
| *F16B 2/02* | (2006.01) |
| *F16B 5/06* | (2006.01) |

(52) U.S. Cl.
CPC ............ *A47K 10/3836* (2013.01); *A47K 1/09* (2013.01); *A47K 10/16* (2013.01); *F16B 2/065* (2013.01); *A47C 7/62* (2013.01); *A47K 10/18* (2013.01); *F16B 2/02* (2013.01); *F16B 5/06* (2013.01)

(58) Field of Classification Search
CPC ...... A47K 10/3836; A47K 1/09; A47K 10/04; A47K 10/18; A47K 10/16; F16M 13/022; F16M 11/10; F16M 11/04; F16M 11/041; F16M 2200/022; F16M 2200/024; F16M 2200/066; F16M 2200/02; F16M 11/105; F16M 11/125; F16M 11/2028; F16M 11/2057; F16B 2/065; F16B 5/0614; F16B 5/06; F16B 2001/0035; F16B 2/00; A47C 7/62
See application file for complete search history.

(56) References Cited

U.S. PATENT DOCUMENTS 586,295 A * 7/1897 Terry .......................... B62J 6/03 248/299.1
897,072 A * 8/1908 Eckhardt ................. F23D 91/02 126/229
1,495,189 A * 5/1924 Mack ......................... B60R 9/02 29/283
D147,623 S * 10/1947 Silvers ........................ 248/309.2
2,732,159 A * 1/1956 Conners ................. A47K 10/10 248/251

(Continued)

*Primary Examiner* — Devin K Barnett
(74) *Attorney, Agent, or Firm* — Invention To Patent Services; Alex Hobson

(57) ABSTRACT

A caddy system is detachably attachable to a portable commode via a caddy retainer having a caddy retainer key that is configured for insertion into a retainer key receiver of a retainer bracket. The retainer bracket is configured with an actuator arm that is moved by an actuator to clamp against a support with a clamp arm on an opposing side. A caddy receptacle is configured to articles therein, such as hygiene products. A toilet paper retainer rail extends from the caddy receptacle and is configured to retain toilet paper roll thereon. The toilet paper retain rail may be configured to extend from either side or opposing sides of the caddy receptacle.

16 Claims, 10 Drawing Sheets

(56) References Cited

U.S. PATENT DOCUMENTS

| | | | | | |
|---|---|---|---|---|---|
| 2,968,394 | A * | 1/1961 | Appelt | B65D 67/02 | 206/756 |
| 3,239,272 | A * | 3/1966 | Wilkins | A47C 7/68 | 211/119.007 |
| 3,291,521 | A * | 12/1966 | Krueger | A47C 7/622 | 248/210 |
| D228,738 | S * | 10/1973 | Alexander | D8/394 | |
| 3,881,677 | A * | 5/1975 | Ihlenfeld | A47G 23/0225 | 248/311.2 |
| 3,955,722 | A * | 5/1976 | Bard | D05C 1/04 | 38/102.2 |
| 3,987,993 | A * | 10/1976 | Hopkins | E06C 7/14 | 248/210 |
| 3,991,961 | A * | 11/1976 | Platzer, Jr. | B65B 67/1205 | 248/231.71 |
| 4,287,619 | A | 9/1981 | Brewer | | |
| 4,560,128 | A * | 12/1985 | Willeby | A47G 23/0225 | 297/188.2 |
| 4,632,410 | A | 12/1986 | Bainbridge et al. | | |
| 4,878,642 | A * | 11/1989 | Kirby, Jr. | A47K 1/08 | 248/230.1 |
| 4,957,254 | A * | 9/1990 | Hill | A47G 23/0225 | 248/311.2 |
| 5,048,130 | A | 9/1991 | Brotman | | |
| 5,190,257 | A * | 3/1993 | Gradei | E06C 7/14 | 248/231.71 |
| 5,386,961 | A * | 2/1995 | Lu | B62J 11/00 | 248/912 |
| 5,447,237 | A | 9/1995 | Carter et al. | | |
| 5,472,157 | A * | 12/1995 | Lehrman | D06F 79/02 | 38/104 |
| 5,624,095 | A * | 4/1997 | Zissu | A47G 21/16 | 248/300 |
| 5,829,723 | A * | 11/1998 | Brunner | A61M 5/1415 | 248/222.13 |
| 6,170,680 | B1 * | 1/2001 | Hung | A47C 1/11 | 211/119.007 |
| 6,305,035 | B1 | 10/2001 | Morris | | |
| 6,481,679 | B1 * | 11/2002 | Bennett | F16M 13/022 | 248/223.41 |
| 6,484,989 | B1 * | 11/2002 | Connery | A47D 15/00 | 108/26 |
| 6,601,813 | B1 * | 8/2003 | Kager | F16M 13/00 | 248/314 |
| 6,929,229 | B1 * | 8/2005 | Palmby | A47G 23/0225 | 248/314 |
| 6,983,918 | B1 * | 1/2006 | Leasure | A63B 27/00 | 248/274.1 |
| 7,111,812 | B2 * | 9/2006 | Shannon | F16M 13/00 | 248/227.3 |
| 7,967,137 | B2 * | 6/2011 | Fulbrook | A61B 50/33 | 206/370 |
| 8,695,957 | B2 * | 4/2014 | Quintania | A61B 90/57 | 269/74 |
| 9,121,423 | B2 * | 9/2015 | Sharpe | F16M 13/022 | |
| 9,999,719 | B2 * | 6/2018 | Kitchen | A61M 5/1415 | |
| 10,124,929 | B1 * | 11/2018 | Michaux | A47K 11/02 | |
| 10,906,574 | B1 * | 2/2021 | Neal | B62B 3/1424 | |
| 11,668,333 | B2 * | 6/2023 | Cupit | F16M 13/022 | 248/231.71 |
| 2002/0096610 | A1 * | 7/2002 | Fernandez | G09F 7/18 | 248/223.41 |
| 2004/0094494 | A1 * | 5/2004 | Klein | A47B 96/16 | 211/119.004 |
| 2006/0011787 | A1 * | 1/2006 | Law | A47J 37/0786 | 248/121 |
| 2006/0081747 | A1 * | 4/2006 | Sherman | F16M 11/041 | 248/309.1 |
| 2006/0081748 | A1 * | 4/2006 | Sherman | A47L 13/51 | 248/309.1 |
| 2006/0081749 | A1 * | 4/2006 | Sherman | F16M 13/02 | 248/309.1 |
| 2006/0284041 | A1 * | 12/2006 | Segretto | A47G 23/0225 | 248/311.2 |
| 2007/0034767 | A1 * | 2/2007 | Mastropaolo | A47B 23/02 | 248/231.71 |
| 2007/0080274 | A1 * | 4/2007 | Ouellette | E04G 5/00 | 248/311.2 |
| 2007/0095769 | A1 * | 5/2007 | Jenkins | A47K 10/38 | 211/119.009 |
| 2007/0267551 | A1 * | 11/2007 | Townsend | A61M 5/1415 | 248/311.2 |
| 2009/0050770 | A1 * | 2/2009 | Perlman | A47B 23/04 | 248/346.11 |
| 2009/0173746 | A1 * | 7/2009 | Lin | A47K 10/38 | 221/45 |
| 2010/0243660 | A1 * | 9/2010 | Manasas | A47K 5/00 | 220/555 |
| 2011/0133523 | A1 * | 6/2011 | Crowe | A47C 4/286 | 211/119.007 |
| 2013/0193261 | A1 * | 8/2013 | Tuttle | A47K 10/3836 | 74/519 |
| 2015/0090849 | A1 * | 4/2015 | Breitweiser | F16M 11/04 | 248/230.1 |
| 2021/0059400 | A1 * | 3/2021 | Culveyhouse | A47B 23/025 | |
| 2024/0130913 | A1 * | 4/2024 | Chong | A61G 13/009 | |

* cited by examiner

CADDY SYSTEM AND METHOD OF ATTACHMENT TO A SUPPORT

CROSS REFERENCE TO RELATED APPLICATIONS

This application claims the benefit of priority to U.S. provisional patent application No. 63/442,048, filed on Jan. 30, 2023; the entirety of which is hereby incorporated by reference herein.

BACKGROUND OF THE INVENTION

Field of the Invention

The invention relates to a caddy system and particularly to a toilet caddy that is detachably attachable to a portable commode via a caddy retainer coupled to a retainer bracket.

Background

Portable commodes, often used in hospital and nursing home settings provide a convenient means for toilet use in close proximity to a person's bed, wherein the person does not have to walk long distances to a bathroom. Elderly people with mobility challenges, and people recovering from an illness or surgery, as well as those with incontinence may not be able to make it to bathroom that is too far away from their bed or hospital bed. There may be a risk of injury from a recent surgery and the patient may be directed to use a portable commode next to their bed. Also, the elderly may have balance problems and trouble seeing in the dark at night to make their way to a restroom.

These portable commodes do not provide a toilet paper holder or any other location to retain personal or hygiene items. The toiletries may be provided on a nearby table or counter or simply placed on the floor. It has been common practice for inpatient facilities to provide a bin for toiletries, however there is no designated place for it. This makes it inconvenient for a person to retrieve their toiletries when needed, especially if they have mobility/balance issues.

SUMMARY OF THE INVENTION

The invention relates to a caddy system and particularly to a toilet caddy that is detachably attachable to a portable commode via a caddy retainer having a caddy retainer key that is configured for insertion into a retainer key receiver of a retainer bracket. The caddy system has a caddy receptacle for receiving objects therein that may be secured to a support that is part of a portable commode or any other suitable support, such as a hand rail or rod or pole. The retainer bracket has an actuator arm that is actuated toward a clamp arm to pinch the support therebetween to retain the retainer bracket to the support. The retainer bracket also has a retainer key receiver configured to receive the retainer key of the caddy retainer extending from the caddy receptacle to secure the caddy to the retainer bracket and to the support.

A caddy system is versatile and can be moved from one support to another. The caddy receptable may be detached from the retainer bracket by pulling the retainer key out of the retainer key receiver. The retainer key is part of the caddy retainer that extends from the caddy retainer and having a retainer key and a retainer key couple and optionally a retainer key flange, that extends from the retainer key, distal from the retainer key stop a distance of about 5 mm or more, about 10 mm or more, about 20 mm or more and any range between and including the retainer key flange extension lengths provided. The retainer key receiver is configured to receive the retainer key and the key flange receiver is configured to receive a retainer key flange and the retainer key coupler. The retainer key receiver may have a dove tail shape, with a key flange receiver that extends as an opening in the retainer bracket to the retainer key receiver. The retainer key receiver may be wider than the key flange receiver. The key flange receiver may be configured (have a shape and size) to receive the key flange therein and the retainer key receiver may be configured (have a shape and size) to receive the retainer key therein.

An exemplary caddy forms a caddy receptacle for receiving objects such as personal hygiene products, toiletries and the like. The exemplary caddy has a, left side, a right side, a base, a front side, and an opposing retainer side. The caddy may be circular in shape or may have curved sections between the sides of the caddy.

The retainer side of the caddy has the caddy retainer extending therefrom. The retainer key and retainer key coupler along with the retainer key stop form the caddy retainer. The retainer key coupler extends from the side of the caddy to the retainer key that is offset from the side of the caddy. A retainer key stop extends the retainer key and rests on the retainer bracket when the retainer key is inserted into the retainer key receiver. The retainer key coupler may be narrower in width than the retainer key, wherein the retainer key flares outward from the retainer key coupler. The retainer key coupler may have a width that is less than the width of the retainer key by at least 20%. The retainer key may be wider than the retainer key coupler by a factor of at least two. The retainer key may extend from the retainer key coupler orthogonally, such that the retainer key extends to be substantially parallel (within 15 degrees of parallel) with the side of the caddy receptacle from which the key flange is attached. The caddy retainer extends from a retainer side of the caddy. Note that the caddy receptacle may have curved sides, and may be oval or circular in cross section. The retainer side may along a curved surface of the caddy receptacle. A caddy receptacle may have solid sides and base or they may have apertures or be made of a screen or wire to form the receptacle having apertures small enough to effectively prevent items from falling therethrough.

The caddy retainer is configured for insertion into the caddy retainer receiver having a retainer key receiver and the key flange receiver. The retainer key receiver is configured to receive the retainer key and the key flange receiver is configured to receive a retainer key flange and the retainer key coupler.

The caddy retainer may also have the aforementioned retainer key flange that extends down from the retainer key coupler past the extended end of the retainer key, extended from the retainer key stop. The retainer key flange may be curved and may have a concave curve to aid in aligning and caddy retainer with the retainer key receiver. A user may insert the retainer key flange into the key flange receiver and then slide the caddy and caddy retainer down to insert the retainer key in the retainer key receiver and the retainer key coupler into the key flange receiver.

A caddy retainer may include the retainer key, retainer key coupler and the retainer key stop that are contiguous, wherein they are all connected and the retainer key flange may also be contiguous with the caddy retainer. The retainer key stop may extend over and be wider than the retainer key and/or the retainer key coupler to top the retainer key from sliding further down into the retainer key receiver.

An exemplary retainer bracket has a fixed arm, a clamp arm and an actuator arm that is actuated towards the clamp arm to reduce the retainer clamp opening by an actuator, such as a threaded actuator. A threaded actuator may extend through the fixed arm and turning the threaded actuator in the threaded actuator aperture of the fixed arm moves the actuator arm attached to the threaded actuator. An actuator handle, such as a knob on the end of the threaded actuator may enable manual operation of the retainer bracket to actuate the actuator arm to clamp the retainer bracket to a support. The caddy retainer receiver may be configured in the retainer bracket proximal to the clamp arm end, to reduce torque on the support and clamp from the weight of the caddy receptacle.

A caddy may include a caddy toilet paper bracket that is coupled to the caddy receptacle. A toilet paper retainer may be detachably attachable to the caddy receptacle by the caddy toilet paper bracket. The toilet paper retainer may have a toilet paper rail that is configured to be retained by a caddy toilet paper bracket by sliding into one or more bracket apertures. One or more caddy toilet paper brackets may be configured in linear alignment along the caddy receptacle, such as along the base of the caddy receptacle. The toilet paper retainer rail may be slide into the brackets to effectively secure the toilet paper retainer rail in position, extending from the caddy receptacle. The toilet paper rail may have a toilet paper extension that extends at an offset angle from the toilet paper rail, such as about 45 degrees or more, about 60 degrees or more, about 90 degrees or more, or orthogonally (within 10 degrees of 90 degrees) to receive the core of a toilet paper roll thereon.

A toilet paper rail or other dove-tail shaped rail may be configured for insertion into a dove-tail receiver configured in an extended end of the fixed arm. The fixed arm may extend further out form the connector portion of the retainer bracket an extension distance from an extended end of the clamp arm and/or extended end of the actuator arm.

The caddy receptacle may be sized to retainer personal hygiene products and items and may have a length or diameter of about 15 cm or more, about 20 cm or more, about 30 cm or more and any range between and including the dimensions provided. The height of the caddy receptacle from the caddy base to the opening to the caddy may be about 8 cm or more, about 10 cm or more, about 15 cm or more, about 20 cm or more and any range between and including the values provided.

The invention includes a method of attachment of the caddy receptacle to an object such as a chair, or more specifically a chair support or leg of a chair. The caddy system may also be attached to other fixed object, such as hand rails, or poles. The method includes attaching a retainer bracket to a support by turning the threaded actuator in the threaded actuator aperture of the fixed arm to move the actuator arm toward the clamp arm and thereby clamp the support between the actuator arm and the clamp arm. Then the caddy receptacle may be slid down into the retainer key receiver of the retainer bracket, wherein the retainer key of the caddy retainer is configured to fit into the retainer key receiver. The caddy receptacle may have a caddy toilet paper bracket configured to receive a toilet paper rail that has a toilet paper extension to retain toilet paper thereon.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
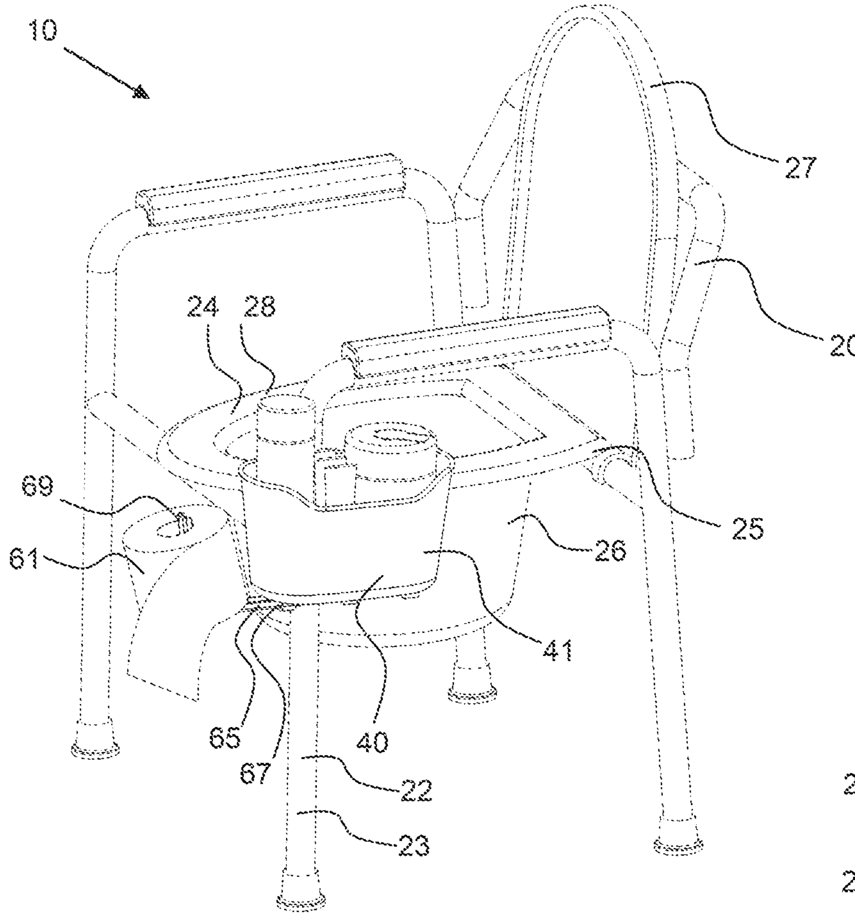
FIG. 1 shows a perspective view of an exemplary caddy system with the caddy attached to a support of the portable commode and retaining personal items and a roll of toilet paper on a toilet paper retainer coupled to the caddy.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms “comprises,” “comprising,” “includes,” “including,” “has,” “having” or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of “a” or “an” are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
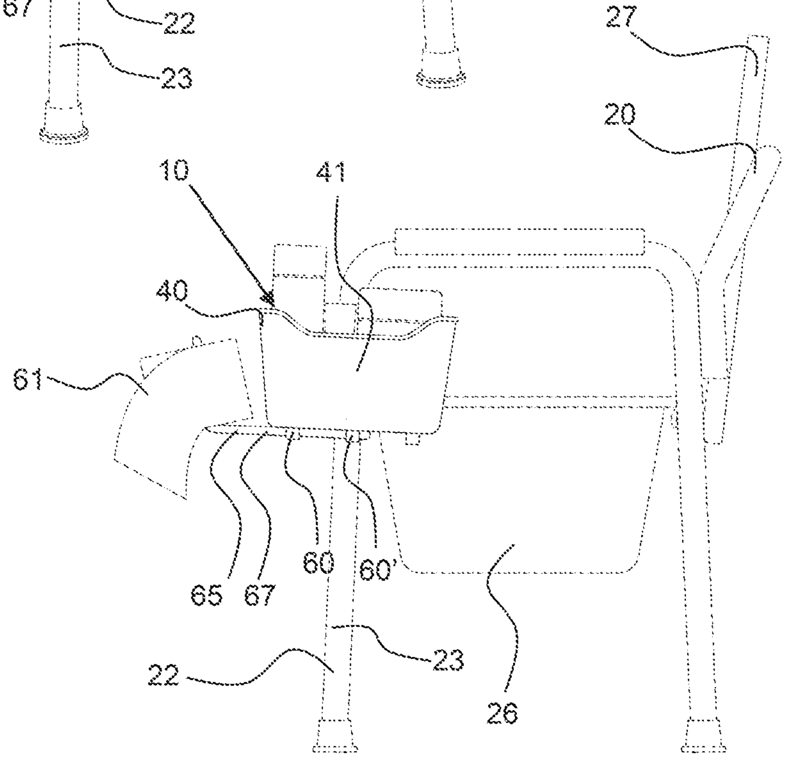
FIG. 2 shows a side view of an exemplary caddy system with the caddy attached to a support of the portable commode and retaining personal items and a roll of toilet paper on a toilet paper retainer coupled to the caddy.
Figure 3:
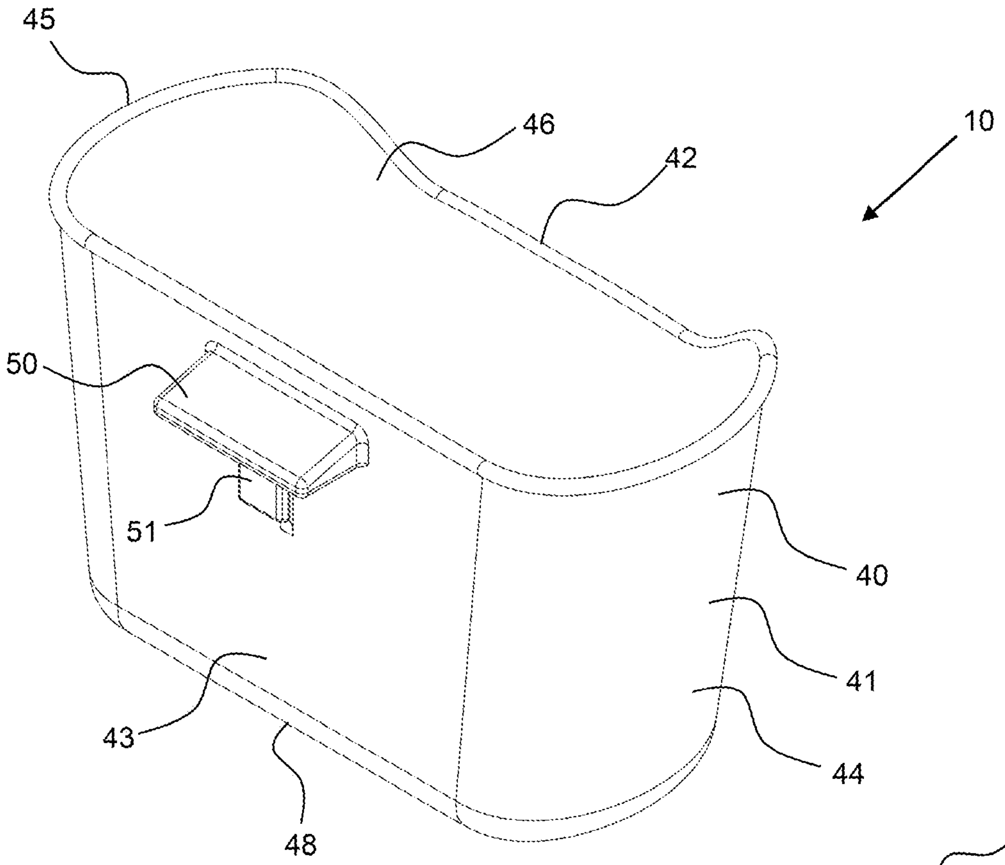
FIG. 3 shows a perspective view of a retainer side of a caddy.
Figure 4:
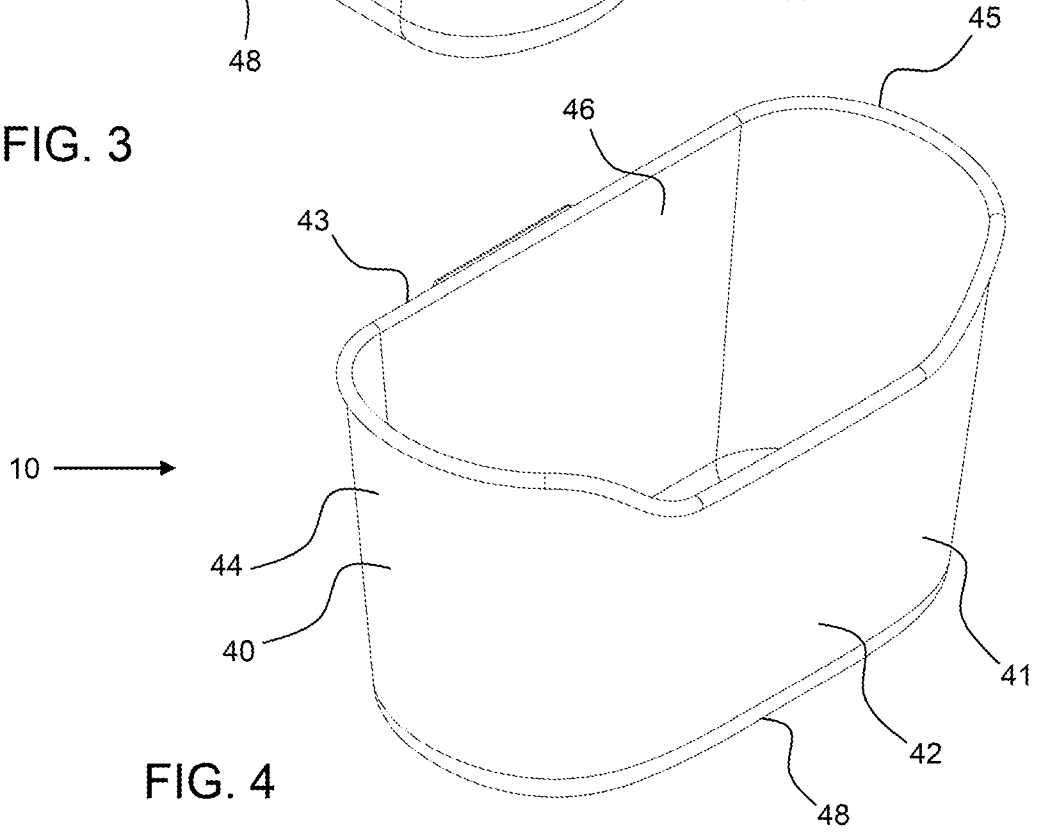
FIG. 4 shows a perspective view of a front-side of the caddy shown in FIG. 3.

As shown in FIGS. 1 and 2, a caddy system 10 is coupled to a support 22 of a chair 20. A chair seat 24 also serves as a toilet seat 28. A toilet receptacle 26 is configured beneath the toilet seat 28 whereby the chair 20, toilet seat 28, and toilet receptacle 26 form a portable commode 25. A caddy 40 is detachable attached to the support 22, such as a chair support or leg 23 of the chair 20. The chair support may be round, or polygonal, square or rectangular, in cross-sectional shape. A caddy receptacle 41 of the caddy 40 is used to hold items such as toiletries. A toilet seat cover 27 may be configured to rotate down over the chair seat 24 and toilet receptacle 26 to prevent foul odor from the toilet receptacle from escaping.

A toilet paper roll 61 is held on the caddy 40 by a toilet paper retainer 65 having a toilet paper retainer rail 67 that extends from the caddy receptacle 41. The toilet paper retainer rail 67 is inserted into a plurality of linearly aligned caddy toilet paper brackets 60, 60', as shown in FIG. 2. The core of the toilet paper is configured on the toilet paper retainer extension 69, that extends up from the toilet paper retainer rail 67.

As shown in FIGS. 3 to 9, the caddy receptacle 41 of the caddy 40 is formed by a front side 42, a retainer side 43, opposite the front side 42, a left side 44, and a right side 45, opposite the left side 44. The front side 42, retainer side 43, left side 44, and right side 45 all contact a base 48. An opening 46 is configured opposite the base 48 in the top for receiving items therein. Toiletries or other items may be placed into the caddy receptacle 41 via the opening 46. A caddy receptacle may have one or more dividers for organizing items therein.

A caddy retainer 50 extends from the retainer side 43 of the caddy receptacle 41. The caddy retainer 50 has a retainer key 51, configured an offset distance from the retainer side 43 by a retainer key coupler 52 that extends from the retainer key to the retainer side 43 of the caddy retainer 50. A retainer key flange 53 extends down from the retainer key coupler 52 and to the retainer side 43 of the caddy retainer 50 and is more narrow in width than the retainer key, forming a dove-tail cross-sectional geometry of the retainer key and retainer key coupler. A retainer key stop 56 extends over the retainer key and is configured to support the caddy on the retainer bracket (shown in later figures).

Figure 7:
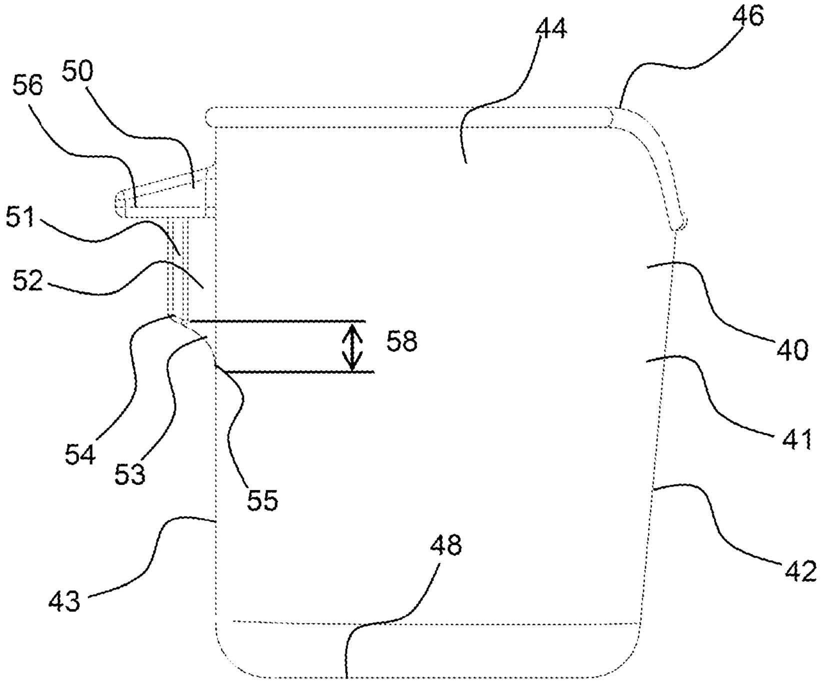
FIG. 7 shows a left side view of the caddy shown in FIG. 3.
Figure 8:
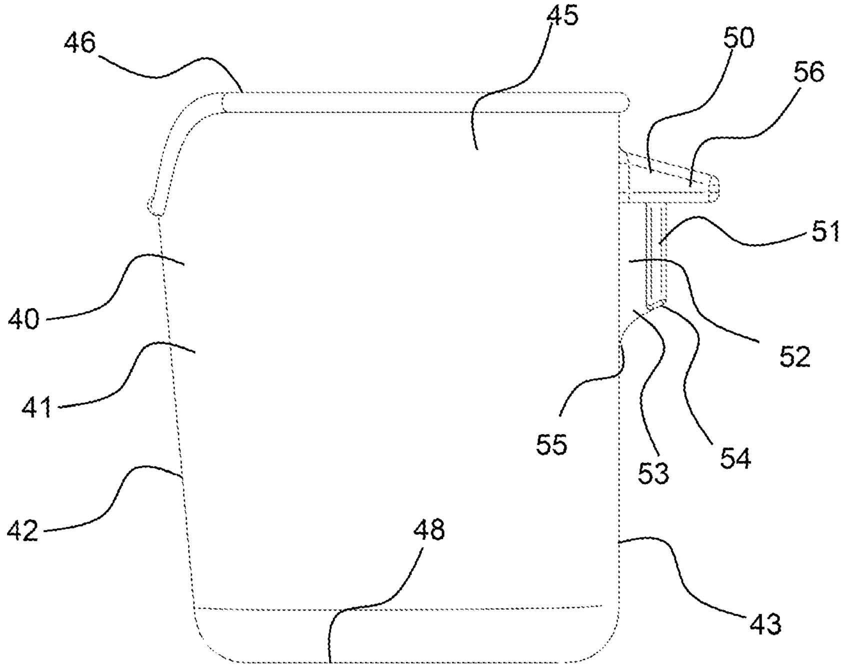
FIG. 8 shows a right side view of the caddy shown in FIG. 3.
Figure 9:
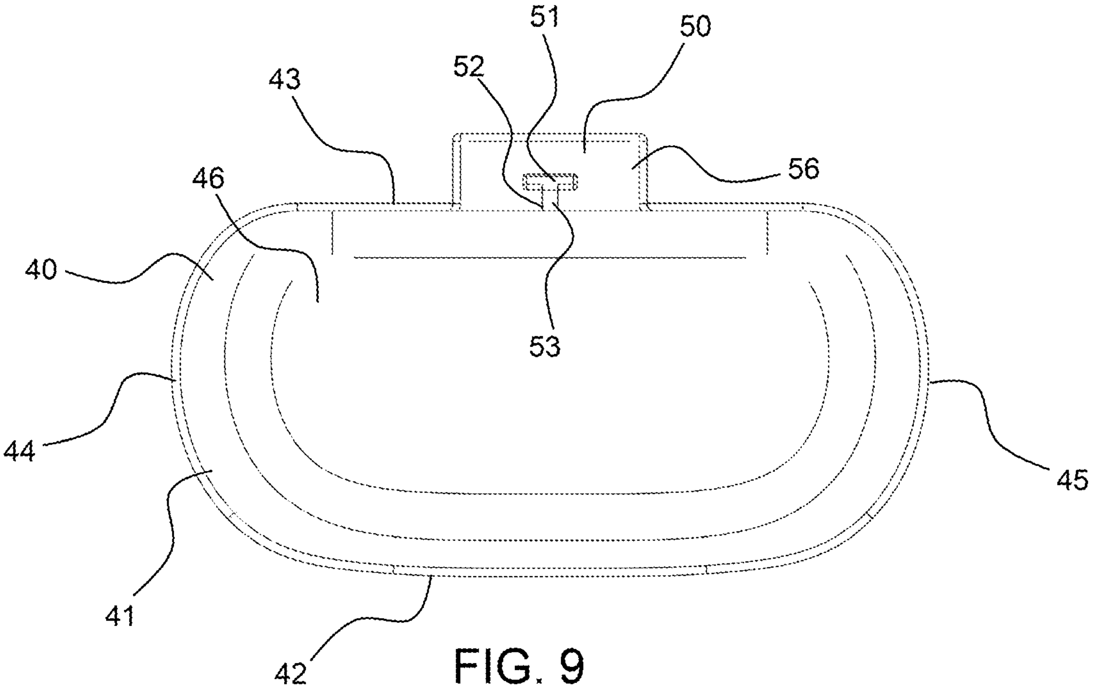
FIG. 9 shows a base view of the caddy shown in FIG. 3.

The retainer key extends down to the caddy retainer key extended end 54, which is the end of the retainer key 51 most distal from the retainer key stop 56. The retainer key flange 53 extends down vertically, or along a vertical axis 12 of the caddy retainer 50, to the retainer key coupler extended end 55, which is more distal from the retainer key stop 56 than the caddy retainer key extended end 54 of the retainer key. The retainer key coupler extended end 55 is offset an offset distance 58 from the caddy retainer key extended end 54, as shown in FIG. 7. The retainer key flange 53 is curved along the extended end from the retainer side 43 to the coupling with the retainer key 51. This curved surface enables easier location and insertion into the retainer key receiver of the retainer bracket, as will be shown in later figures.

Figure 5:
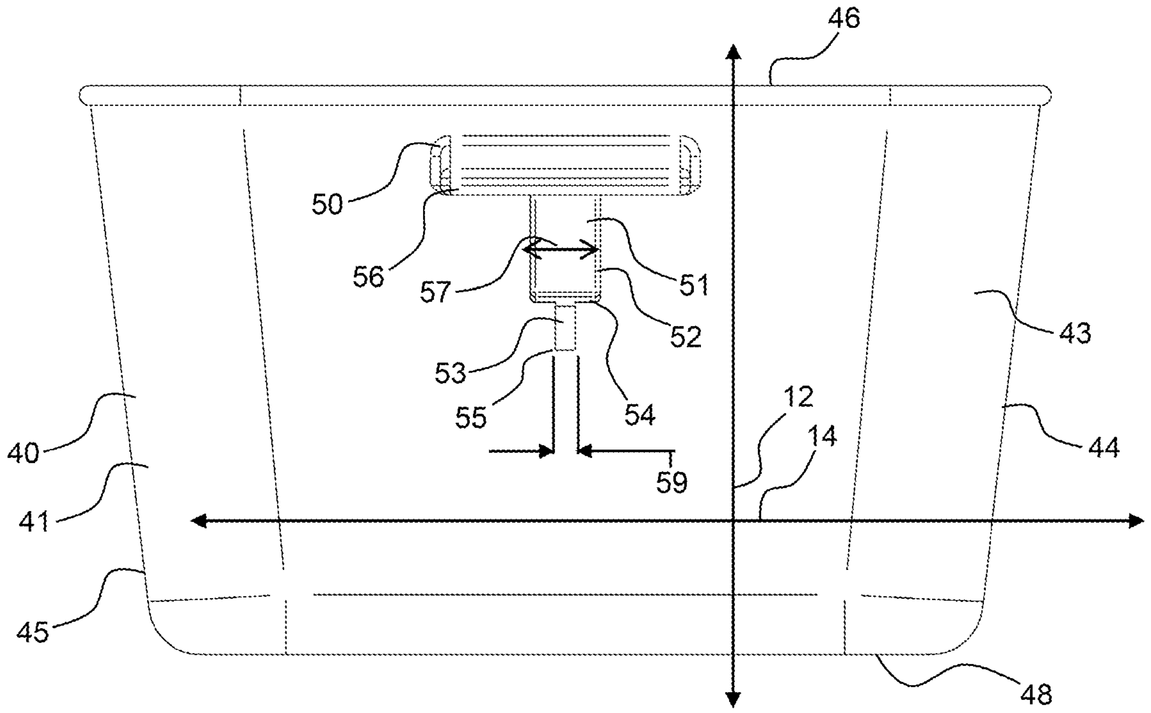
FIG. 5 shows a retainer side view of the caddy shown in FIG. 3.
Figure 6:
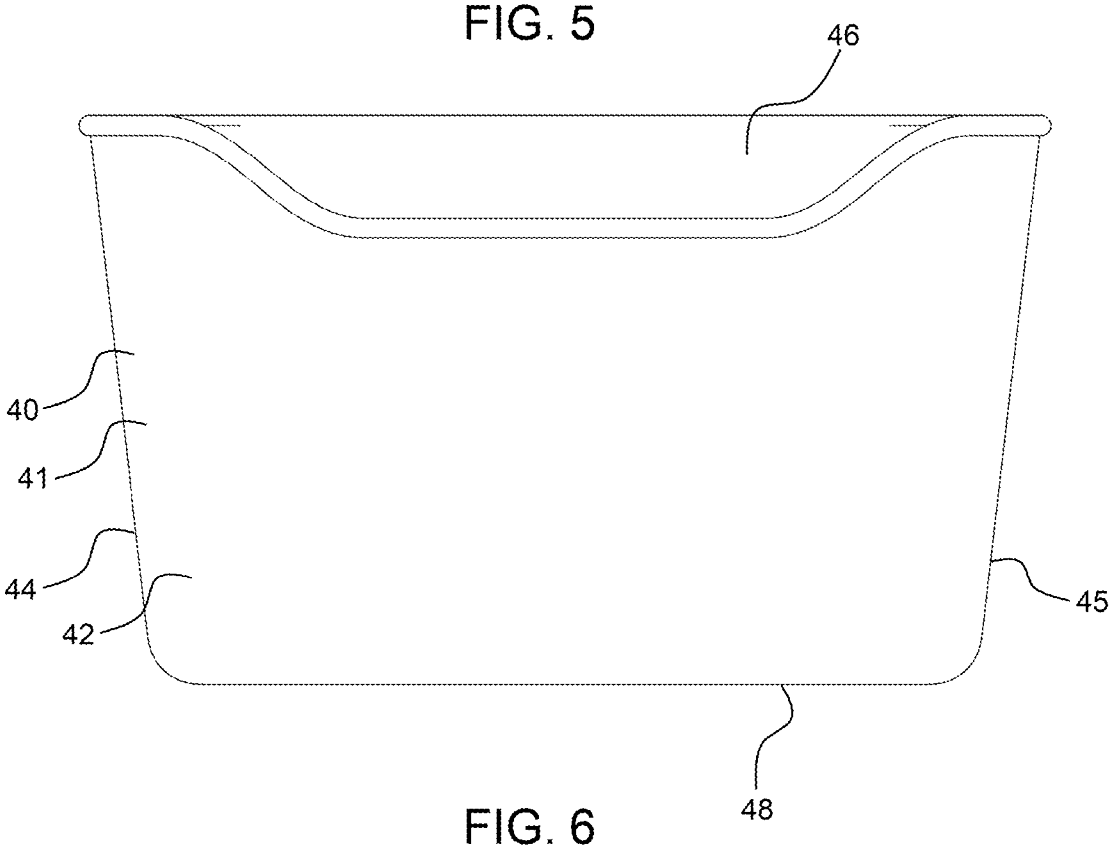
FIG. 6 shows a front-side view of the caddy shown in FIG. 3.

As shown in FIG. 5, the retainer key 51 has a width 57 that is substantially greater than the width 59 of the retainer key coupler 52. The retainer key stop 56 is wider than the retainer key.

The retainer key stop 56 extends perpendicularly to the retainer key coupler 52. The retainer key 51 also has a retainer key coupler 52 which is configured between the retainer key 51 and the retainer side 43 of the caddy receptacle 41. The retainer key coupler 52 causes the retainer key 51 to be offset from the retainer side 43 of the caddy receptacle 41. In an exemplary embodiment, the retainer key flange 53 is an extension of the retainer key coupler 52 and has the same width as the retainer key coupler 52.

Figure 10:
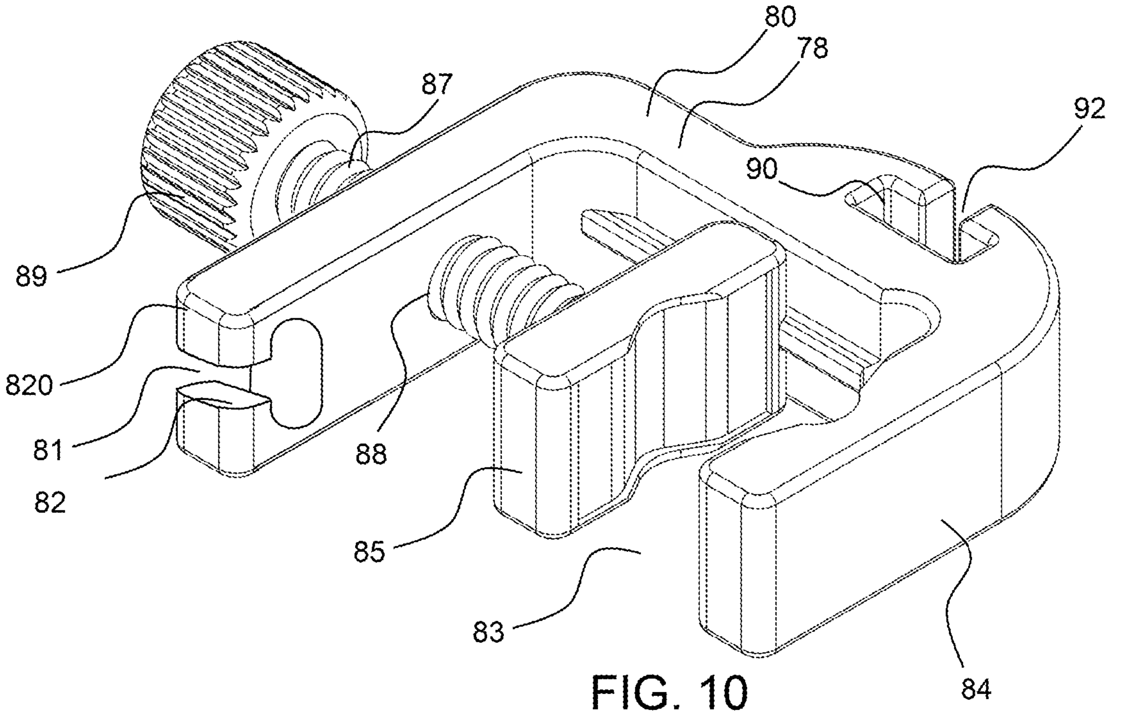
FIG. 10 shows a perspective view of a retainer bracket.
Figure 11:
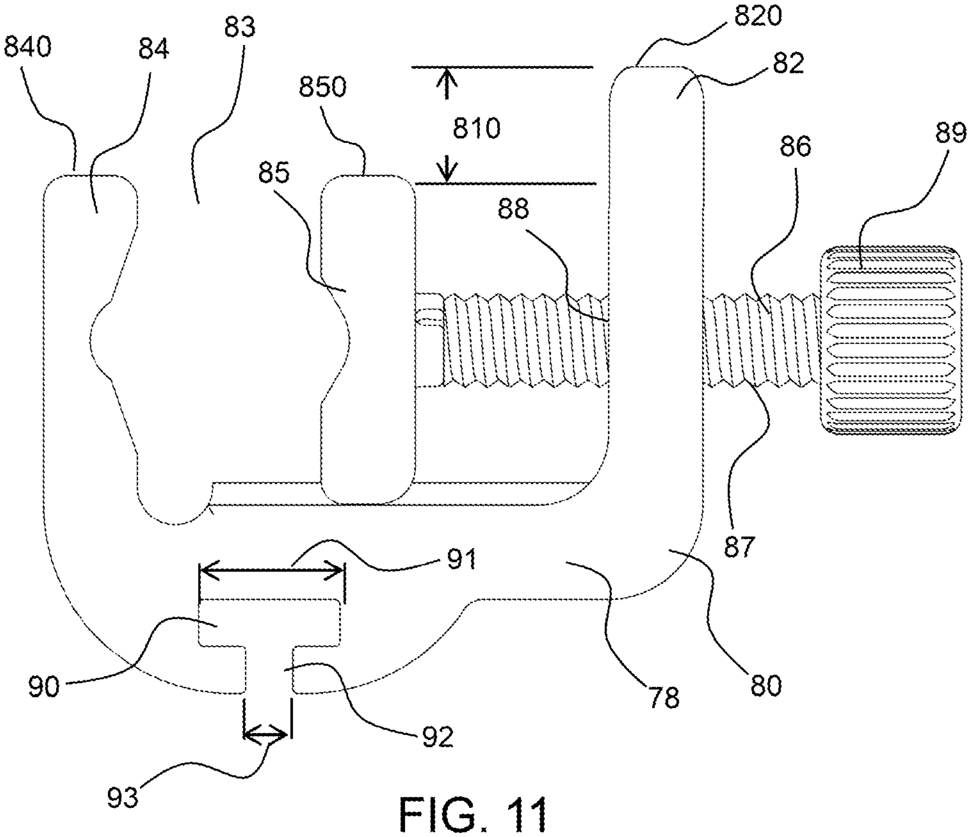
FIG. 11 shows a top view of the retainer bracket shown in FIG. 10.

As shown in FIGS. 10 and 11, a retainer bracket 80 has a fixed arm 82, a clamp arm 84, and an actuator arm 85. The fixed arm 82 and clamp arm 84 extend from a connector portion 78 of the retainer bracket that connects the two arms. The actuator arm 85 is coupled to a threaded actuator 87 that extends through a threaded actuator aperture 88 in the fixed arm 82. The fixed arm 82 and clamp arm 84 are both fixed in place. The actuator arm 85 moves back and forth between the fixed arm 82 and clamp arm 84. A retainer clamp opening 83 is configured between the actuator arm 85 and the clamp arm 84. The retainer clamp opening 83 increases in size as the actuator arm 85 moves away from the clamp arm 84 and towards the fixed arm 82. The retainer clamp opening 83 decreases in size as the actuator arm 85 moves towards the clamp arm 84 and away from the fixed arm 82.

As shown in FIGS. 10 and 11, the fixed arm has a dove-tail receiver 81 for attachment of other items to the retainer bracket. A dove-tail shaped extension may be extended through the dove-tail receiver and secured by the corresponding shape. Note that the fixed arm 82 extends an extension distance 810 from the extended end 850 of the actuator arm 85 and also the extended end 840 of the clamp arm 84 to enable coupled of items on either side of the dove-tail receiver 81. The dove-tail receiver 81 is configured in the extended end 820 of the fixed arm 82, extended from the connector portion 78 of the retainer bracket 80.

A threaded actuator 87, having actuator threads 86, is threaded through a threaded actuator aperture 88 of the fixed arm 82. The threaded actuator aperture 88 has threaded aperture threads (not shown) that mate with actuator threads

86 of the threaded actuator 87. The threaded actuator 87 is threaded into the actuator arm 85.

The threaded actuator 87 also has an actuator handle 89 that may be rotated in order to rotate the threaded actuator 87 within the threaded actuator aperture 88 of the fixed arm 82. When the threaded actuator 87 is rotated within the threaded actuator aperture 88, the threaded actuator 87 also rotates within the actuator arm 85. This causes the threaded actuator threads to dynamically engage the actuator arm threads, which causes the actuator arm 85 to move towards the clamp arm 84 or fixed arm 82 depending on the direction of rotation of the threaded actuator 87.

The retainer bracket 80 also has a retainer key receiver 90 and a key flange receiver 92. The retainer key receiver 90 has a retainer key receiver width 91 that is slightly larger than the retainer key width, to enable insertion of the retainer key. The key flange receiver 92 has a key flange receiver width 93 that is slightly larger than the retainer key flange and retainer key coupler width to enable insertion of the retainer key coupler and the retainer key coupler.

Figure 12:
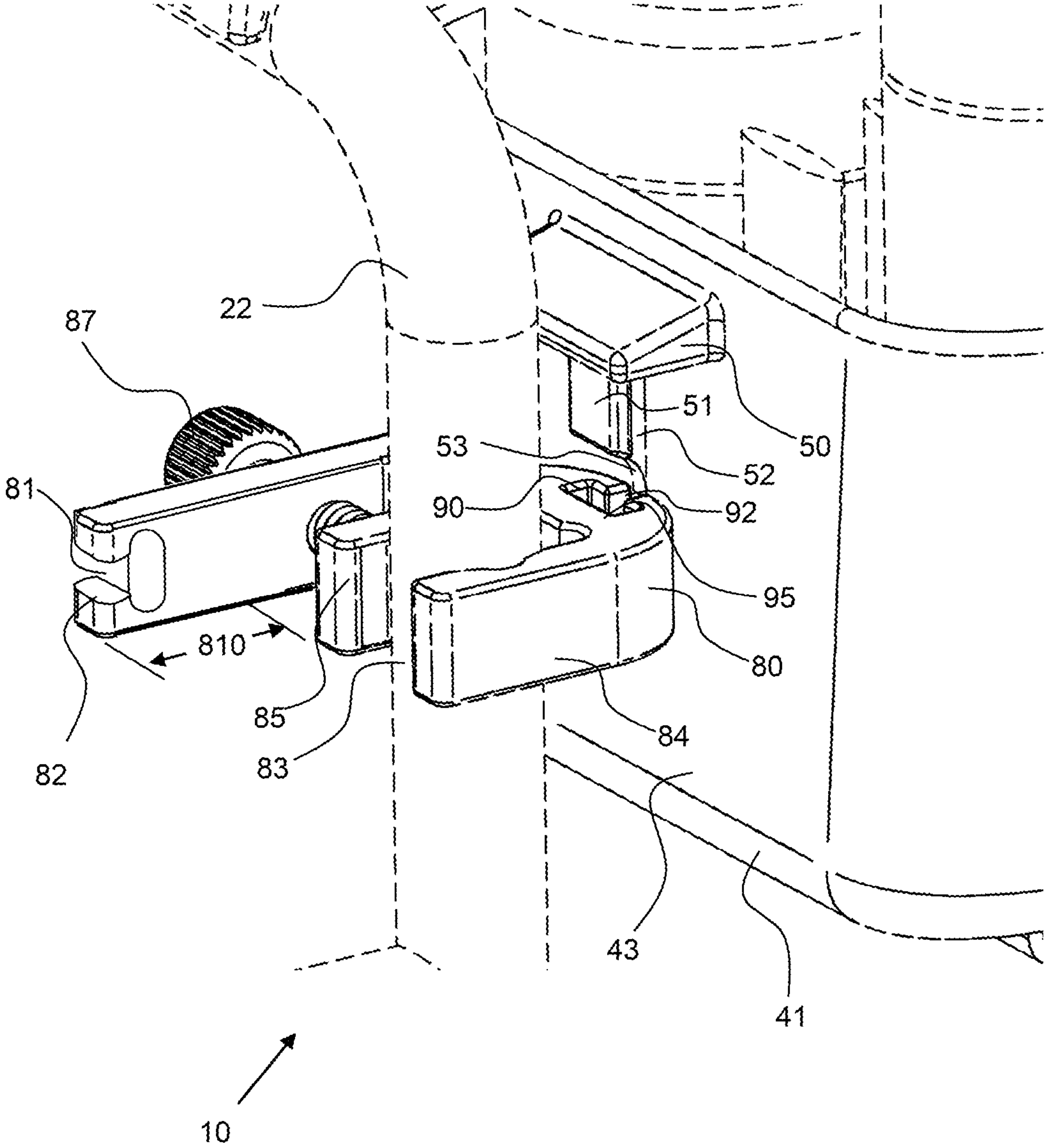
FIG. 12 shows a perspective view of an exemplary caddy being detachably attached to a retainer bracket via insertion of the caddy retainer key into the retainer key receiver of the retainer bracket that is coupled to a portable commode support.
Figure 13:
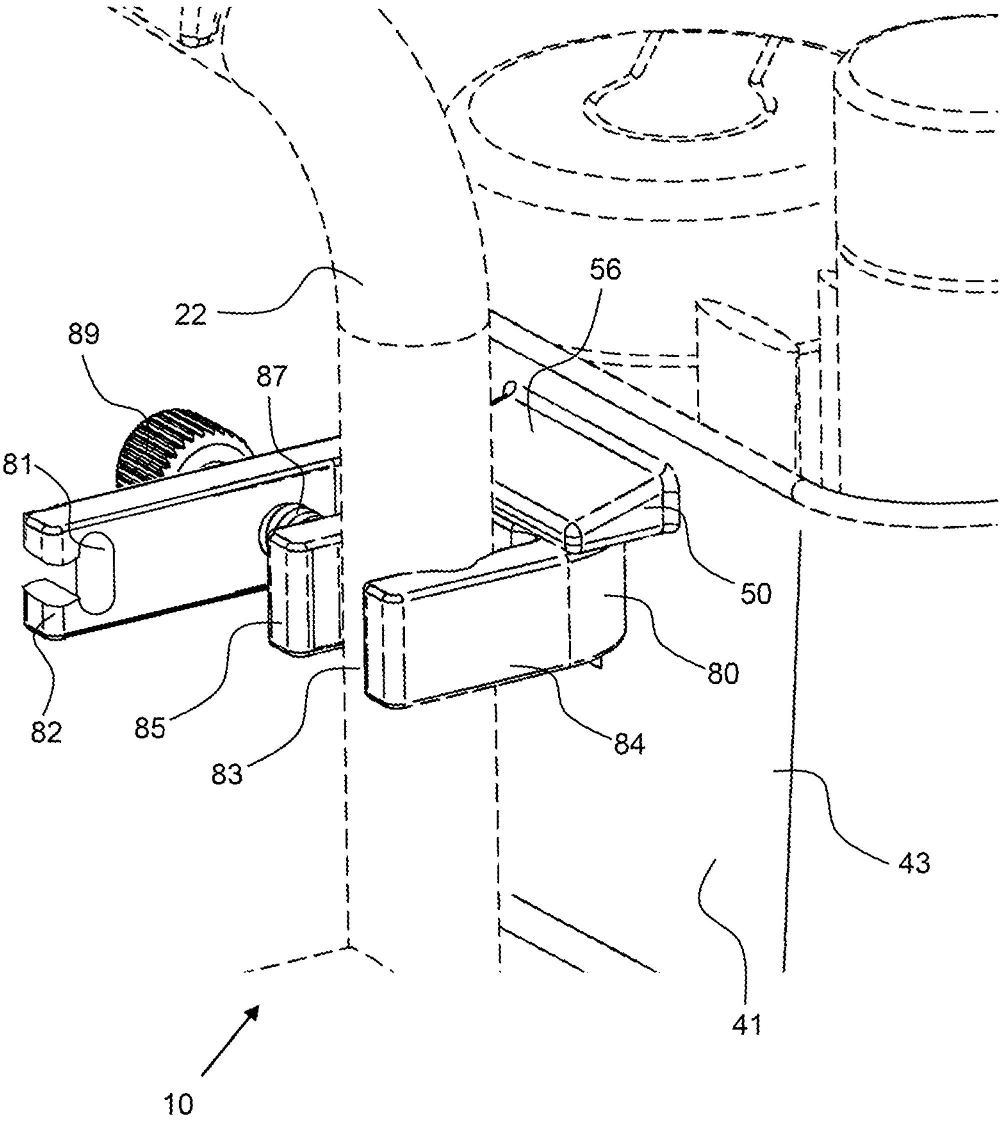
FIG. 13 shows a perspective view of the exemplary caddy shown in FIG. 12 now attached to the retainer bracket and coupled to the portable commode.
Figure 14:
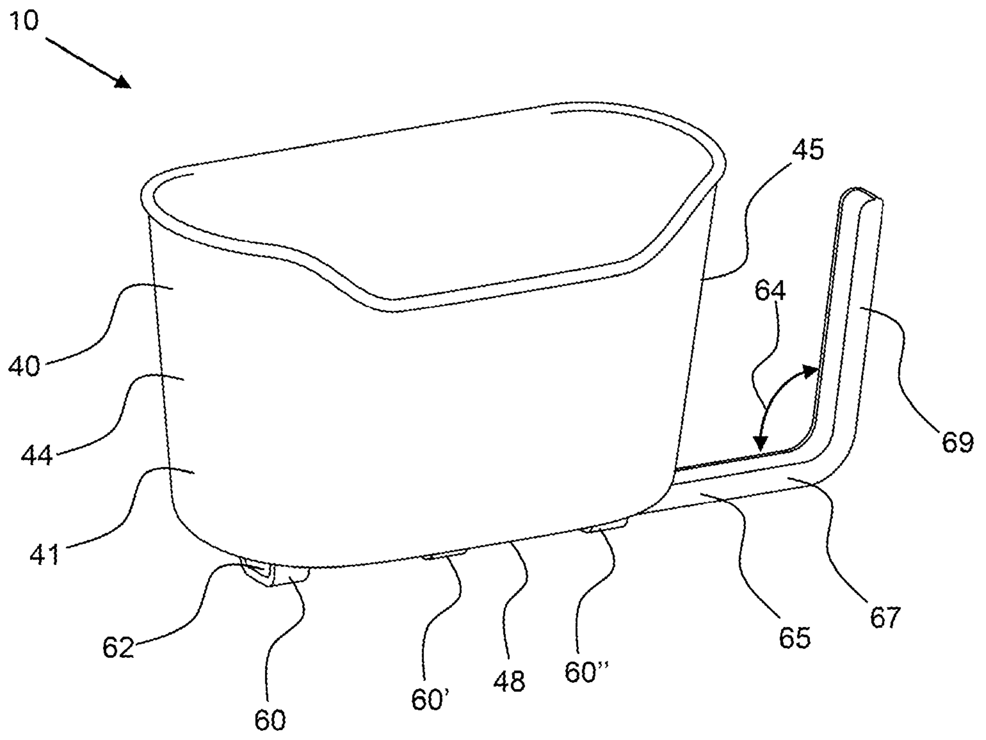
FIG. 14 shows a front left perspective view of the exemplary caddy shown in FIG. 3, with a toilet paper retainer coupled to the caddy by the caddy toilet paper bracket and extending out from the right side of the caddy.
Figure 15:
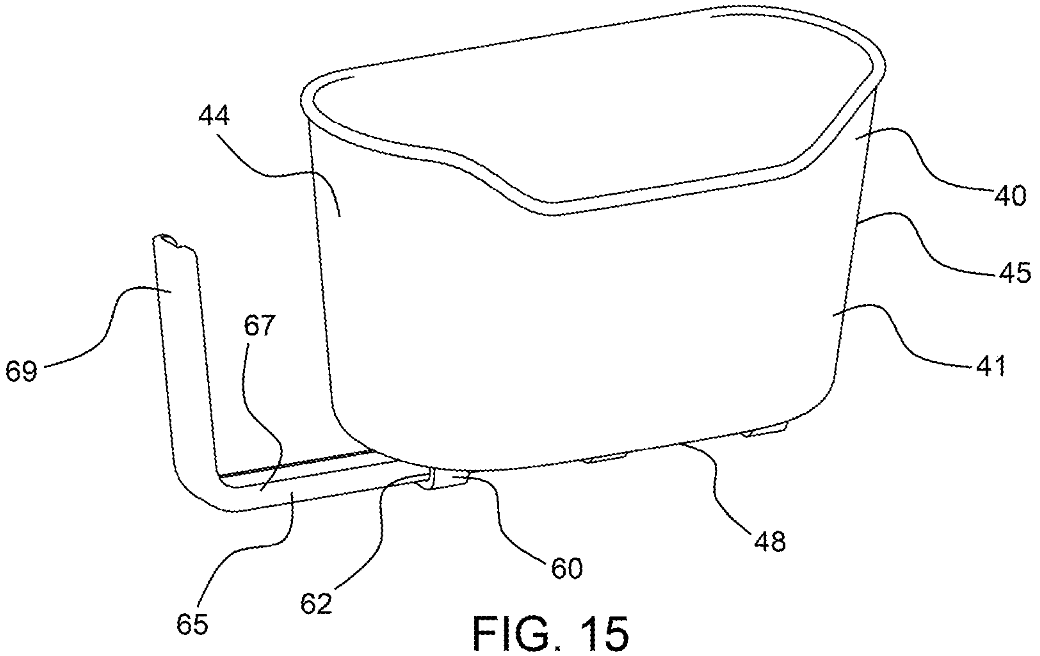
FIG. 15 shows a front right perspective view of the exemplary caddy shown in FIG. 14, with a toilet paper retainer now coupled to the caddy by the caddy toilet paper bracket and extending out from the left side of the caddy.
Figure 16:
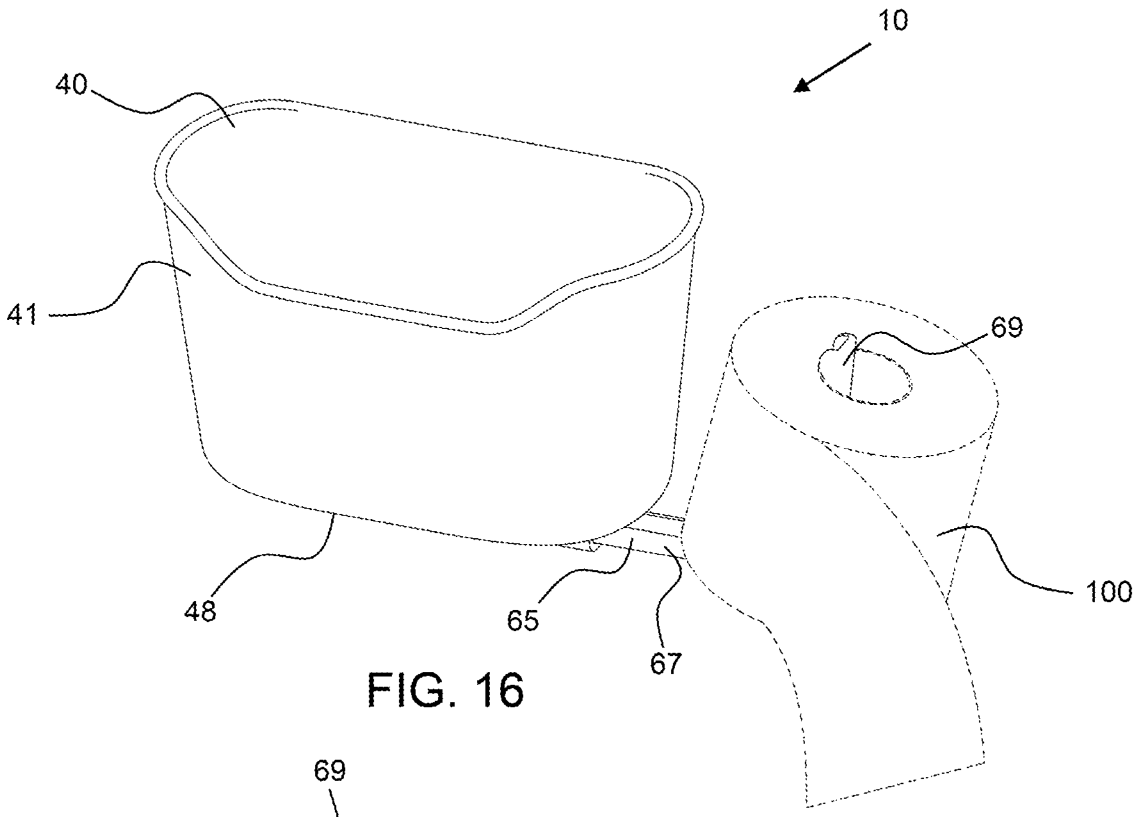
FIG. 16 shows a front left perspective view of the exemplary caddy shown in FIG. 14, with a toilet paper roll retained on the toilet paper retainer.
Figure 17:
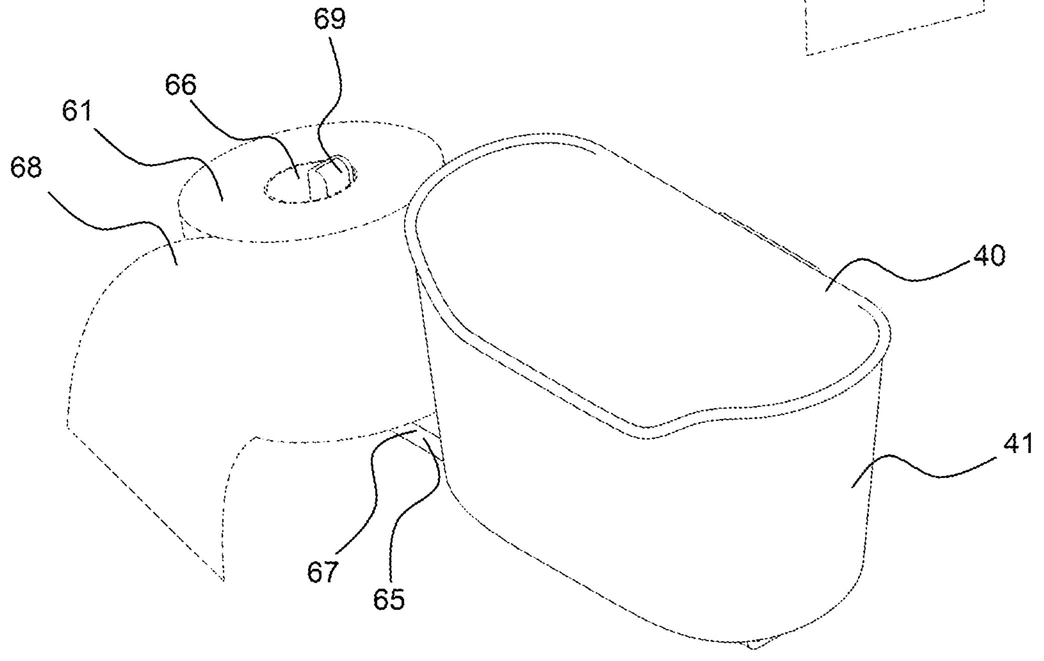
FIG. 17 shows a front right perspective view of the exemplary caddy shown in FIG. 15, with a toilet paper roll retained on the toilet paper retainer.

As shown in FIGS. 12, and 13, a support 22 is configured in the retainer clamp opening 83 between the actuator arm 85 and the clamp arm 84. The threaded actuator 87 is rotated whereby the actuator arm 85 moves towards the clamp arm 84 to decrease the retainer clamp opening 83. This causes the retainer bracket 80 to firmly clamp onto the chair 20 support 22. The caddy receptacle 41 of the caddy 40 is configured onto the retainer bracket 80 by mating the retainer key 51 with the retainer bracket 80. This allows the caddy 40 to be detachably attached to the support 22 of the chair 20. The dove-tail receiver 81 is shown on the extended end of the fixed arm 82 for attachment of other items to the retainer bracket 80. The dove-tail receiver 81 is an aperture into the extended end of the fixed arm 82 that has a narrow portion that leads to an enlarged portion, as shown. A dove-tail shaped rail, such as a toilet paper retainer rail 67, as shown in FIGS. 16 and 17 may be inserted through the dove-tail receiver to secure toilet paper to the retainer bracket 80.

As shown in FIG. 12 the retainer key 51 is mated with the retainer bracket 80 by first aligning the retainer key flange 53 with the retainer key flange receiver 92. This insertion with the curved edge of the retainer key flange guides the caddy retainer 50 into the caddy retainer receiver 95, the T-shaped aperture in the retainer bracket 80 that retains the caddy receptacle 41 to the retainer bracket. The retainer key thereby aligns and slides into retainer key receiver 90. As shown in FIG. 13, the retainer key coupler 52 is then configured within the retainer key flange receiver 92, and the retainer key 51 configured within the retainer key receiver 90. The retainer key stop 56 contacts the retainer bracket 80 to prevent the retainer key 51 from sliding all the way through the retainer bracket 80. The retainer key receiver width being greater than the key flange receiver width prevents the retainer key 51 from being unintentionally detached from the retainer bracket 80.

As shown in FIGS. 14-17, a toilet paper retainer 65 includes a toilet paper retainer rail 67 that is coupled to the caddy receptacle 41 via caddy toilet paper brackets 60, 60' and 60". The caddy toilet paper brackets 60 are configured on the base 48 of the caddy receptacle 41 and are arranged in a linear configuration to enable the toilet paper retainer rail 67 to slide through two or more of the toilet paper bracket apertures 62. Each of the caddy toilet paper brackets 60, 60' and 60" have a caddy toilet paper bracket aperture 62 through which the toilet paper retainer 65 is inserted. The toilet paper retainer rail 67 extends parallel to the base 48 of the caddy receptacle 41. A toilet paper retainer extension 69 extends at an offset angle 64 from the toilet paper retainer rail 67 away from the base 48 of the caddy receptacle 41. A toilet paper roll 61 is configured on the toilet paper retainer extension 69 whereby the toilet paper retainer 65 holds the toilet paper roll 61 on the caddy 40 next to the caddy receptacle 41. The toilet paper 68 can be easily spool off from the toilet paper roll 61 by spinning the toilet paper roll about the toilet paper retainer extension 69. The core 66 of the toilet paper roll extends around the toilet paper retainer extension 69.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A caddy system comprising:

a) a caddy comprising:
- i) a caddy receptacle having an opening for receiving items therein;
- ii) a caddy retainer extending from the caddy receptable and comprising:
  - a retainer key that is coupled to the caddy receptacle and extending a retainer key width; and
  - a retainer stop extending over the retainer key;
- wherein the retainer key extends to an extended end distal from the retainer key stop;

b) a retainer bracket comprising:
- i) a fixed arm;
- ii) a clamp arm;
- iii) an actuator arm; and
- iv) a caddy retainer receiver comprising:
  - a retainer key receiver configured to receive the retainer key therein to detachably attach the caddy to the retainer bracket;
- wherein the actuator arm is configured to actuate toward the clamp arm to enable the retainer bracket to be clamped onto a portable commode support;

c) a toilet paper retainer coupled to the caddy receptacle,
- wherein the toilet paper retainer is coupled to a base of the caddy receptacle;
- wherein the toilet paper retainer is coupled to a caddy toilet paper bracket configured on the base of the caddy receptacle;
- wherein the toilet paper retainer has a toilet paper retainer rail that extends into a caddy toilet paper bracket aperture; and
- wherein the caddy retainer comprises two or more caddy toilet paper bracket, each with a caddy toilet paper bracket aperture for receiving the toilet paper retainer rail.

2. The caddy system of claim 1, wherein the caddy retainer has a retainer key coupler that extends from the retainer key to a retainer side of the caddy retainer.

3. The caddy system of claim 2, wherein the retainer key coupler has a width that is less than a width of the retainer key by at least 20%.

4. The caddy system of claim 2, wherein the retainer key has a width that is wider than a width of the retainer key coupler by a factor of at least two.

5. The caddy system of claim 1, wherein the caddy receptacle is rectangular in shape being formed by a retainer side, a left side, a right side and a front side.

6. The caddy system of claim 3, wherein the caddy retainer has a retainer key flange that extends from the extended end of the retainer key to a retainer side of the caddy retainer.

7. The caddy system of claim 6, wherein the retainer key flange extends an offset distance that is at least 10 mm from the extended end of the retainer key.

8. The caddy system of claim 7, wherein the retainer key flange has a curved surface from the retainer side of the caddy retainer to the retainer key.

9. The caddy system of claim 8, wherein the curved surface is a concave curved surface.

10. The caddy system of claim 1, wherein the caddy retainer has a retainer key flange that extends from the extended end of the retainer key to a retainer side of the caddy retainer.

11. The caddy system of claim 10, wherein the retainer key flange has a curved surface from the retainer side of the caddy retainer to the retainer key.

12. The caddy system of claim 1, wherein the fixed arm has a threaded actuator aperture and wherein the actuator arm is coupled to a threaded actuator that has actuator threads configured to thread through said threaded actuator aperture to actuate the actuator arm toward the clamp arm.

13. The caddy system of claim 12, wherein the retainer bracket has an actuator handle on the threaded actuator to turn the threaded actuator within the threaded actuator aperture.

14. The caddy system of claim 1, wherein the caddy retainer comprises two or more caddy toilet paper brackets, each with a caddy toilet paper bracket aperture for receiving the toilet paper retainer rail.

15. The caddy system of claim 14, wherein the toilet paper retainer rail has a toilet paper retainer extension that extends up from the toilet paper retainer rail to receive a toilet paper core thereon.

16. The caddy system of claim 15, wherein the toilet paper retainer extension extends orthogonally to the toilet paper retainer rail.

* * * * *